United States Patent [19]

Burns

[11] Patent Number: 4,677,667
[45] Date of Patent: Jun. 30, 1987

[54] SUBSCRIBER LINE CIRCUIT HAVING IMPROVED AC IMPEDANCE MATCHING

[75] Inventor: Robert V. Burns, Phoenix, Ariz.

[73] Assignee: GTE Communication Systems Corporation, Phoenix, Ariz.

[21] Appl. No.: 770,467

[22] Filed: Aug. 29, 1985

[51] Int. Cl.[4] .............................................. H04M 1/76
[52] U.S. Cl. .................................... 379/398; 379/400; 379/399
[58] Field of Search ................ 179/16 AA, 16 A, 70, 179/77, 170 NC, 16 F; 379/398, 399, 400, 402, 403, 394, 405

[56] References Cited

U.S. PATENT DOCUMENTS

| 4,292,479 | 9/1981 | Chataignon et al. | 379/405 |
| 4,375,015 | 2/1983 | Chambers, Jr. | 379/345 |
| 4,387,273 | 6/1983 | Chea, Jr. | 379/398 |
| 4,514,595 | 4/1985 | Rosenbaum et al. | 379/385 |

Primary Examiner—Gene Z. Rubinson
Assistant Examiner—R. Vaas
Attorney, Agent, or Firm—Anthony Miologos; Peter Xiarhos

[57] ABSTRACT

An improved AC impedance matching arrangement including a first amplifier connected to a subscriber loop through the tip and ring conductors of a subscriber line circuit. The first amplifier is arranged to supply loop current to the subscriber loop through first and second resistors. Each resistor having a set DC value. A second amplifier connected to the tip and ring conductors is arranged to develop and output a signal responsive to AC signals applied to the tip and ring conductors from the subscriber loop. A feedback circuit connected to the second amplifier is arranged to receive the second amplifier output signal and develop and output to the first amplifier an impedance matching signal. The impedance matching signal raises the impedance seen by the tip and ring conductors above the set DC value of the first and second resistors.

8 Claims, 1 Drawing Figure

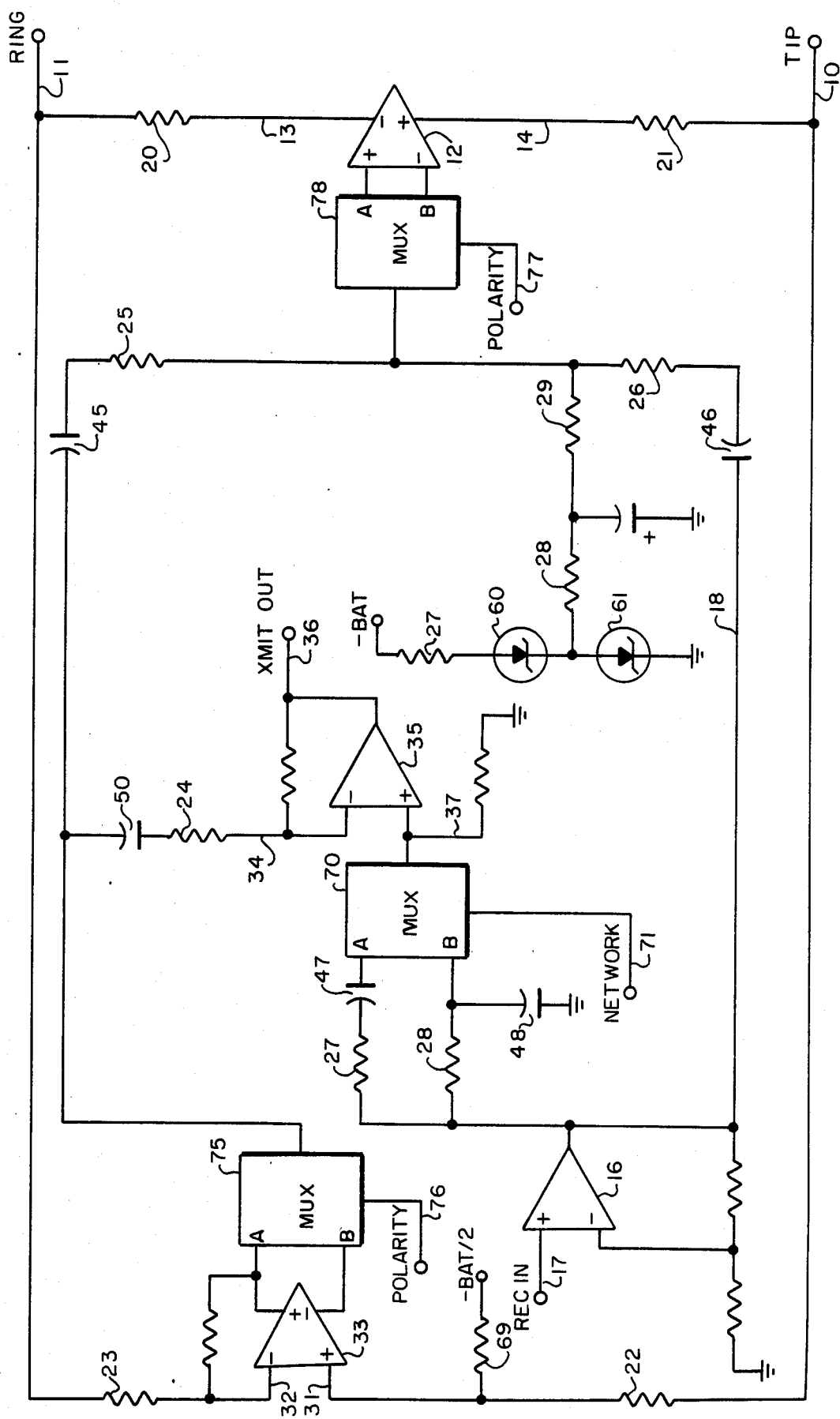

SUBSCRIBER LINE CIRCUIT HAVING IMPROVED AC IMPEDANCE MATCHING

CROSS-REFERENCE TO RELATED APPLICATIONS

The present application is related to co-pending U.S. patent application Ser. No. 770465, titled "A Subscriber Line Circuit Having an Improved Offhook Supervision Circuit", and U.S. patent application Ser. No. 770466, titled "A Subscriber Line Circuit Having An Improved Loop Current Supply Circuit", each having the same inventive entity and each being assigned to the same assignee.

BACKGROUND OF THE INVENTION

This invention relates in general to solid state analog subscriber line circuits used in telecommunication systems and more particularly to a solid state analog subscriber line circuit having an improved AC impedance matching capability and longitudinal signal rejection.

Traditionally subscriber line circuits have used inductive type battery feed circuits. These circuits provide excellent performance and low cost but their characteristic components require large amounts of space and have great weight.

Analog line circuits which use lighter and smaller solid state components are finding increased usage in the telecommunications industry today. However, these circuits do not provide performance equal to the inductive line circuits of the past. One of the disadvantages to the presently known solid state analog line circuits is their inability to function in the presence of high longitudinal voltages and currents on the tip and ring leads of the line circuit.

One technique presently known for overcoming the above mentioned shortcomings is the use of a small transformer and associated circuitry which cancels any magnetic flux in the transformer produced by the loop current. This technique finds disadvantage in that it provides inferior performance relative to a larger transformer and it consumes additional power in the flux cancellation winding of the transformer.

It therefor becomes an object of the present invention to provide a solid state analog line circuit which exhibits performance superior to an inductive line circuit in the area of AC impedance matching and longitudinal signal rejection.

SUMMARY OF THE INVENTION

In accomplishing the object of the present invention there is provided a subscriber line circuit having a tip conductor and a ring conductor connected to a subscriber loop circuit.

The improved AC impedance matching arrangement of the present invention comprises a first amplifier means or line circuit means including a first output connected to the tip conductor through first resistance means having a set DC value. A second output of the first amplifier means is connected to the ring conductor through a second resistance means also having a set DC value. The first amplifier means is arranged to supply loop current to the subscriber loop circuit.

A second amplifier means or sensing means includes a first input connected to the tip conductor and a second input connected to the ring conductor. The second amplifier means is arranged to develop and output a signal in response to AC signals applied to the tip and ring conductors from the subscriber loop circuit.

A feedback generating means or impedance means is connected to the second amplifier means and arranged to receive the second amplifier means output signal. The feedback generating means then develops a feedback signal which is output to the first amplifier means. The feedback signal raises the impedance seen by the tip and ring conductors above the DC value of the first and second resistance means thereby, providing any AC impedance desired.

A BRIEF DESCRIPTION OF THE DRAWINGS

The single sheet of drawings included herewith comprise a schematic diagram of a subscriber line circuit having improved AC impedance matching and longitudinal signal rejection embodying the principles of operation of the present invention.

DESCRIPTION OF THE PREFERRED EMBODIMENT

Turning now to the single sheet of the included drawings, the present invention is shown connected to a subscriber loop circuit via a pair of loop conductors. A tip conductor labeled 10 and the ring conductor labeled 11. Loop conductors 10, 11 are driven by buffer amplifier 12 which is comprised of a unity gain differential output amplifier. The inverting output 13 of buffer amplifier 12 drives the ring conductor 11 thru resistor 20. The non-inverting output 14 of buffer amplifier 12 drives the tip conductor 10 thru resistor 21. Buffer amplifier 12 serves to supply DC loop current as well as AC RECV signals to the loop.

Signals to be output to the subscriber loop circuit are applied first to the RECV IN lead 17 and the non-inverting input of receive amplifier 16 and then via lead 18 to buffer amplifier 12 and the tip and ring conductors 10, 11 respectively. These signals are transported across the subscriber loop to a subscriber instrument and applied to the receiver.

XMIT signals from a subscriber instrument transmitter are sent over the subscriber loop and appear at the tip and ring conductors 10 and 11 respectively. The XMIT signals appearing at the tip conductor 10 are applied to the non-inverting input 31 of buffer amplifier 33 via resistor 22. Buffer amplifier 33 is also comprised of a unity gain differential output amplifier. Likewise the XMIT signal appearing on the ring conductor 11 is applied to the inverting input 32 of buffer amplifier 33 via resistor 23. The output of buffer amplifier 33 is sent to the inverting input of transmit amplifier 35 via capacitor 50 and resistor 24. The received XMIT signal is output via the XMIT OUT lead 36.

RECV signals to the tip and ring conductors 10, 11 by receive amplifier 16 and buffer amplifier 12 also appear at the input of transmit amplifiers 35. In order to prevent these signals from reaching the XMIT OUT lead 36, RECV signals from the output of receive amplifier 16 are also applied to the non-inverting input 37 of transmit amplifier 35. The RECV signals than cancel at the output of transmit amplifier 35.

For applications requiring two or more balancing networks multiplexer 70 selects the desired network from a first resistor capacitor combination comprising of resistor 27 and capacitor 47, and a second resistor capacitor combination comprising resistor 28 and capacitor 48. A network enable lead 71 toggles multiplexer 70 and switches in the selected network.

DC loop current is supplied to the tip and ring conductors 10, 11 by applying a DC bias voltage to the input of buffer amplifier 12. The bias voltage is applied to the input of buffer amplifier 12 from the negative battery source though a network consisting of resistor 27, zener diodes 60, 61 and resistors 28, 29. The voltage drop across zener diode 61 insures that the bias voltage will be a fixed voltage below the supply voltage. The bias voltage is required to be sufficiently below the supply voltages powering buffer amplifier 12 in order to allow adequate AC signal swing at the output of buffer amplifier 12.

Normally, the DC battery feed resistance of the line circuit is lower than the AC impedance of the loop circuit. In order to provide proper impedance matching with the loop circuit, the present invention uses internal feedback to achieve any desired AC impedance of tip and ring.

AC signals appearing at the tip and ring conductors 10 and 11 are transported and applied to buffer amplifier 33. The output of buffer amplifier 33 is passed to amplifier 12 via a divider network consisting of resistor 25, capacitor 45 and resistor 26, capacitor 46. The feedback signal applied to buffer amplifier 12 from buffer amplifier 33 is in phase with the signal appearing at the tip and ring conductors 10, 11. The input signal applied is thus reinforced and raises the impedance seen by the tip and ring conductors above the DC value of resistors 20 and 21.

Longitudinal signals induced by power lines into the subscriber loop and appearing at the tip and ring conductors 10, 11 are cancelled out by the common mode rejection of receive amplifier 16 and therefore do not appear at the XMIT OUT lead 36 of transmit amplifier 35. In order to insure that the all longitudinal signals are cancelled by buffer amplifier 33 the tip and ring impedances must be equal and therefore the gains of the two inputs 31, 32 of buffer amplifier 33 must be equal. The level of longitudinal signals which can be cancelled by the invention is determined by the ability of buffer amplifier 12 to sink equal amounts of current without becoming non-linear, and the ability of buffer amplifier 33 to maintain equal gains at its inputs as the longitudinal voltage increases.

It therefor becomes necessary that the resistors 20 and 21 be matched as close as possible. Slight mismatches can be compensated for in the invention by adjusting the gain balance of buffer amplifier 33. In order to provide for extremely high rejection of longitudinal signals, resistor 29 may be adjusted to compensate for other circuit components which may effect longitudinal balance and rejection.

Polarity reversal of the tip and ring conductors is accomplished by multiplexers 75 and 78 which select the inverting output of buffer amplifier 33 and the non-inverting input of buffer amplifier 12 when enabled via enabling signals applied to the network leads 76 and 77 respectively by common control equipment (not shown).

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a subscriber line circuit having a tip conductor and a ring conductor connected to a subscriber loop circuit and to a source of AC signals, an improved AC impedance matching arrangement comprising:

a first amplifier means including a first output connected to said tip conductor through first resistance means having a set DC value and a second output connected to said ring conductor through second resistance means having a set DC value, said first amplifier means arranged to supply loop current to said subscriber loop circuit, said first amplifier further including a first input and a second input;

second amplifier means including a first input connected to said tip conductor and a second input connected to said ring conductor, said second amplifier means arranged to develop an output signal responsive to AC signals applied to said tip and ring conductors from said source of AC signals;

feedback generating means connected to said second amplifier means, said feedback generating means arranged to receive said second amplifier means output signal and output a feedback signal; and, first selection means including an input connected to said feedback generating means and first and second outputs connected to said first amplifier means first and second inputs respectively, said first selection means further including an enabling lead connected to common control equipment and a source of enabling signals, said first selection means arranged to connect said first amplifier first input or alternatively said second input to said feedback generating means responsive to said enabling signals;

and said feedback signal is passed to said first amplifier means raising the impedance seen by said tip and ring conductors above the DC value of said first and second resistance means.

2. The subscriber line circuit as claimed in claim 1, wherein: said first amplifier means comprises a unity gain differential output amplifier having a non-inverting output connected to said first resistance means and comprising said first output, and a inverting output connected to said second resistance means and comprising said second output, said unity gain differential output amplifier further including a non-inverting and an inverting input, said non-inverting and said inverting inputs each connected to said first and said second outputs respectively of said first selection means.

3. The subscriber line circuit as claimed in claim 1, wherein: said first resistance means comprises a resistor connected in series between said first amplifier means first output and said tip conductor and said second resistance means comprises a resistor connected in series between said first amplifier means second output and said ring conductor.

4. The subscriber line circuit as claimed in claim 1, wherein: said second amplifier means comprises a unity gain differential output amplifier having a non-inverting input connected to said tip conductor and an inverting input connected to said ring conductor, said unity gain differential output amplifier further including a non-inverting and an inverting output and said non-inverting and inverting outputs connected to second selection means, said second selection means further including an output connected to said feedback generating means, and an enabling lead connected to common control equipment and a source of enabling signals, and responsive to said enabling signals said second selection means connects said unity gain differential output amplifier non-inverting input or alternatively said inverting input to said feedback generating means.

5. The subscriber line circuit as claimed in claim 2, wherein: said feedback generating means comprises a voltage divider having a first resistor capacitor network and a second resistor capacitor network, and said first selection means input is connected to said voltage divider intermediate said first and second resistor capacitor networks.

6. The subscriber line circuit as claimed in claim 4, wherein: said feedback generating means comprises a voltage divider having a first resistor capacitor network and a second resistor capacitor network, and said second selection means output is connected to said first resistor capacitor network.

7. The subscriber line circuit as claimed in claim 2, wherein: said first selection means comprises a multiplexer, and responsive to the polarity of said AC signals applied to said tip and ring conductors, said enabling lead receives an enabling signal connecting said unity gain differential output amplifiers non-inverting input or alternatively said inverting input to said multiplexer input and said feedback signal.

8. The subscriber line circuit as claimed in claim 4, wherein: said second selection means comprises a multiplexer, and responsive to the polarity of said AC signals applied to said tip and ring conductors, said enabling lead receives an enabling signal connecting said unit gain differential output amplifier non-inverting output or alternatively said inverting output to said multiplexer output, connecting said unity gain differential output amplifier output signal to said feedback means.

* * * * *